(12) United States Patent
Hahm et al.

(10) Patent No.: US 10,153,999 B2
(45) Date of Patent: *Dec. 11, 2018

(54) METHOD AND APPARATUS FOR COLLECTING FEED INFORMATION IN MOBILE TERMINAL

(71) Applicant: SAMSUNG ELECTRONICS CO., LTD., Suwon-si (KR)

(72) Inventors: Seongil Hahm, Yongin-si (KR); Juyoun Lee, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/484,318

(22) Filed: Apr. 11, 2017

(65) Prior Publication Data

US 2017/0222965 A1 Aug. 3, 2017

Related U.S. Application Data

(63) Continuation of application No. 15/424,339, filed on Feb. 3, 2017, which is a continuation of application
(Continued)

(30) Foreign Application Priority Data

Apr. 16, 2012 (KR) .................. 10-2012-0039012

(51) Int. Cl.
*G06F 15/16* (2006.01)
*H04L 12/58* (2006.01)
(Continued)

(52) U.S. Cl.
CPC ............ *H04L 51/32* (2013.01); *G06F 3/0482* (2013.01); *G06F 3/04883* (2013.01);
(Continued)

(58) Field of Classification Search
CPC ......... H04L 51/32; H04L 51/16; H04L 67/22; G06F 3/0482; G06Q 10/101; H04W 4/12
(Continued)

(56) References Cited

U.S. PATENT DOCUMENTS

2008/0009311 A1 1/2008 Nam et al.
2009/0049156 A1* 2/2009 Aronsson ............... G06Q 10/10
709/219
(Continued)

FOREIGN PATENT DOCUMENTS

EP 2385689 A1 11/2011
EP 2 294 576 B1 1/2018
(Continued)

OTHER PUBLICATIONS

Communication dated Nov. 12, 2015, issued by the European Patent Office in counterpart European Application No. 13778869.1.
(Continued)

*Primary Examiner* — Wing F Chan
*Assistant Examiner* — Joseph R Maniwang
(74) *Attorney, Agent, or Firm* — Sughrue Mion, PLLC

(57) ABSTRACT

A method and apparatus for collecting feed information in a mobile terminal are disclosed. The method and apparatus collects information explicitly clipped by a user as well as content items exchanged between users as feed information. The method for collecting feed information in a mobile terminal includes: detecting a share event corresponding to transmission or reception of content through a communication application implemented in the mobile terminal; generating feed information based on the content; and storing the generated feed information.

18 Claims, 14 Drawing Sheets

Related U.S. Application Data

No. 13/863,774, filed on Apr. 16, 2013, now Pat. No. 9,615,220.

(51) Int. Cl.

| | | |
|---|---|---|
| *H04W 4/12* | (2009.01) | |
| *H04L 29/08* | (2006.01) | |
| *G06Q 10/10* | (2012.01) | |
| *G06Q 50/00* | (2012.01) | |
| *G06F 3/0488* | (2013.01) | |
| *G06F 3/0482* | (2013.01) | |
| *H04M 1/725* | (2006.01) | |
| *H04N 7/18* | (2006.01) | |

(52) U.S. Cl.
CPC .......... *G06Q 10/10* (2013.01); *G06Q 10/101* (2013.01); *G06Q 50/01* (2013.01); *H04L 51/16* (2013.01); *H04L 67/10* (2013.01); *H04L 67/22* (2013.01); *H04L 67/26* (2013.01); *H04L 67/30* (2013.01); *H04M 1/72583* (2013.01); *H04N 7/185* (2013.01); *H04W 4/12* (2013.01)

(58) Field of Classification Search
USPC ......................................................... 709/206
See application file for complete search history.

(56) References Cited

U.S. PATENT DOCUMENTS

| | | | |
|---|---|---|---|
| 2009/0204885 A1 | 8/2009 | Ellsworth et al. | |
| 2009/0327341 A1 | 12/2009 | Fong et al. | |
| 2010/0070842 A1 | 3/2010 | Aymeloglu et al. | |
| 2010/0100596 A1 | 4/2010 | Strandell et al. | |
| 2010/0332570 A1 | 12/2010 | Roberts et al. | |
| 2011/0161419 A1 | 6/2011 | Chunilal | |
| 2011/0173337 A1 | 7/2011 | Walsh et al. | |
| 2011/0246490 A1 | 10/2011 | Jonsson | |
| 2011/0249144 A1* | 10/2011 | Chang | G06F 17/30259 348/231.3 |
| 2011/0264783 A1 | 10/2011 | Cundill et al. | |
| 2012/0010995 A1* | 1/2012 | Skirpa | G06F 3/0481 705/14.49 |
| 2012/0151383 A1* | 6/2012 | Kazan | G06Q 10/101 715/753 |
| 2013/0007665 A1 | 1/2013 | Chaudhri et al. | |
| 2013/0021368 A1 | 1/2013 | Lee et al. | |

FOREIGN PATENT DOCUMENTS

| | | |
|---|---|---|
| KR | 1020100060498 A | 6/2010 |
| KR | 1020110017166 A | 2/2011 |
| KR | 1020110111722 A | 10/2011 |

OTHER PUBLICATIONS

International Search Report, dated for Aug. 12, 2013, issued by the International Searching Authority in counterpart International Application No. PCT/KR2013/003150.
Non-Final Office Action dated Apr. 10, 2015 in U.S. Appl. No. 13/863,774.
Non-Final Office Action dated Aug. 28, 2015 in U.S. Appl. No. 13/863,774.
Final Office Action dated Dec. 7, 2015 in U.S. Appl. No. 13/863,774.
Non-Final Office Action dated Jul. 6, 2016 in U.S. Appl. No. 13/863,774.
Notice of Allowance dated Nov. 23, 2016 in U.S. Appl. No. 13/863,774.
Non-Final Office Action dated Mar. 15, 2017 in U.S. Appl. No. 15/424,339.
Communication dated Apr. 30, 2018 by the European Patent Office in counterpart European Patent Application No. 13778869.1.

* cited by examiner

METHOD AND APPARATUS FOR COLLECTING FEED INFORMATION IN MOBILE TERMINAL

CROSS-REFERENCE TO RELATED APPLICATIONS

This Application is a Continuation of U.S. application Ser. No. 15/424,339 filed Feb. 3, 2017, which is a Continuation of U.S. patent application Ser. No. 13/863,774 filed Apr. 16, 2013, now U.S. Pat. No. 9,615,220, which claims the benefit under 35 U.S.C. § 119(a) of Korean Patent Application No. 10-2012-0039012, filed on Apr. 16, 2012 in the Korean Intellectual Property Office, the disclosures of which are hereby incorporated by reference in their entirety.

BACKGROUND

Field

The present disclosure relates to collection of feed information in a mobile terminal and, more particularly, to a method and apparatus for a mobile terminal that collects not only information explicitly clipped by a user but also content exchanged between users as feed information and enables sharing of the collected information.

Description of the Related Art

Recent advances in digital technologies have enabled the development of various mobile terminals that enable users in motion to communicate and process personal information, such as mobile communication terminals, personal digital assistants (PDA), electronic organizers, smartphones, and tablet computers. Particularly, high-end mobile terminals have evolved into mobile convergence devices supporting heterogeneous functions originating from distinct fields. For example, a mobile terminal may support various functions related to voice calls, video calls, SMS or MMS messages, electronic notes, image capture, electronic mail, broadcast reception, moving images, Internet access, electronic commerce, music playback, schedule management, social network services (SNS), finding friends, instant messaging, dictionaries, games, and WLAN link formation.

In particular, with advances in social networking technologies, information shareable through social network services is becoming more diverse. For example, in addition to text messages, not only media content, such as music files, photographs and moving images, but also location information may be shared among many users. Social network services are online communities facilitating interpersonal connection, and may cover personal media and information sharing services such as Twitter, MySpace and Facebook. Currently, many people routinely use social network services to communicate with others or to locate and share information.

A user using a mobile terminal may activate an SNS social plugin such as a "Like" or "Share" button to initiate a sharing feature. Currently, various SNS-based applications and webpages provide social plugins for sharing. In such a social network environment, a user may share current states or activity records with other users through explicit selection.

A user may use a sharing button of an installed application or a webpage to provide information to be shared with another user or to collect information provided by another user for sharing. That is, feed information is collected and shared through explicit user input. In other words, information clipped by a user may be used as feed information only when the user explicitly selects the information for sharing.

In this case, content or files exchanged between users may not be collected and shared as feed information.

SUMMARY

The exemplary embodiments disclosed herein have been made in view of the above problems and the exemplary embodiments provide a method and apparatus for a mobile terminal that automatically collect feed information and enable the collected feed information to be effectively shared.

The exemplary embodiments also provide a method and apparatus for a mobile terminal that collect clipped information and content items exchanged between users as feed information for a recommendation service and enable the collected feed information to be effectively shared.

The exemplary embodiments further provide a method and apparatus for a mobile terminal that can enhance user convenience, usability and competitiveness of the mobile terminal by realizing an effective environment for collecting and sharing feed information.

In accordance with an exemplary embodiment, there is provided a method for collecting feed information in a mobile terminal, including: detecting a share event corresponding to transmission or reception of content through a communication application implemented in the mobile terminal; generating feed information based on the content; and storing the generated feed information. The share event corresponds to transmission of the content by the mobile terminal to a second mobile terminal through the communication application or corresponds to reception of content by the mobile terminal from the second mobile terminal through the communication application.

The method may further include: activating a share action during execution of a second application other than the communication application; executing the communication application upon the activating of the share action; transmitting content related to the second application through the communication application; and generating and storing feed information for the content related to the second application.

In accordance with another exemplary embodiment, there is provided a non-transitory computer readable storage medium storing a program that is configured to realize the above method when executed by a processor.

In accordance with another exemplary embodiment, there is provided a mobile terminal including: a storage unit which stores an application program; and a control unit which controls a process of generating feed information based on transmission or reception of content by executing the application program, wherein the application program includes instructions that are configured to detect a share event corresponding to the transmission or the reception of the content through a communication application, generate the feed information based on the content, and store the generated feed information.

In accordance with another exemplary embodiment, there is provided a mobile terminal including: a wireless communication unit which sends and receives the feed information and the content through the communication application; a display unit which displays the sent and received content and displays a feed list of the feed information; and a control unit which controls generation of feed information for content exchanged through the communication application in response to a share event.

In accordance with another exemplary embodiment, there is provided a non-transitory computer readable storage medium storing a program that is configured to cause a computer to: detect a share event corresponding to transmission or reception of content through a communication application, generate feed information based on the content, and store the generated feed information.

Hereinabove, the features and advantages of the exemplary embodiments have been described in a relatively broad perspective to help those skilled in the art understand the exemplary embodiments. Other features and advantages constituting the subject matter of the exemplary embodiments will be more apparent from the following detailed description.

BRIEF DESCRIPTION OF THE DRAWINGS

The features and advantages of the exemplary embodiments will be more apparent from the following detailed description in conjunction with the accompanying drawings, in which.

DETAILED DESCRIPTION OF EXEMPLARY EMBODIMENTS

Hereinafter, exemplary embodiments are described in detail with reference to the accompanying drawings. The same reference symbols are used throughout the drawings to refer to the same or like parts. Detailed descriptions of well-known functions and structures incorporated herein may be omitted to avoid obscuring the subject matter of the exemplary embodiments.

The exemplary embodiments relate to a method and apparatus that collect not only explicitly clipped information but also content items exchanged between users using communication applications as feed information and enable intuitive and effective utilization of the collected feed information (for example, sharing, profile setting, service recommendation or the like).

In the following description, the term "feed information" may refer to information indicating content which is shared between the mobile terminal and the other mobile terminal (or a plurality of additional mobile terminals), such as a description of content (e.g., content name, content image and the like) for the shared content, sharer user information and context information (e.g., information related to the context in which the content is shared). The term "communication applications" may refer to applications supporting an exchange of content between users, such as a message application, messenger or chat application, email application, and SNS application. The term "content" may refer to data or items sent or received by communication applications, such as music files, documents, photographs, moving or still images and maps.

Next, a description is given of the configuration and operation of a mobile terminal with reference to the drawings. However, the configuration and operation thereof are not limited to or by the following description, and various changes and modifications are possible on the basis of the following description.

Figure 1:
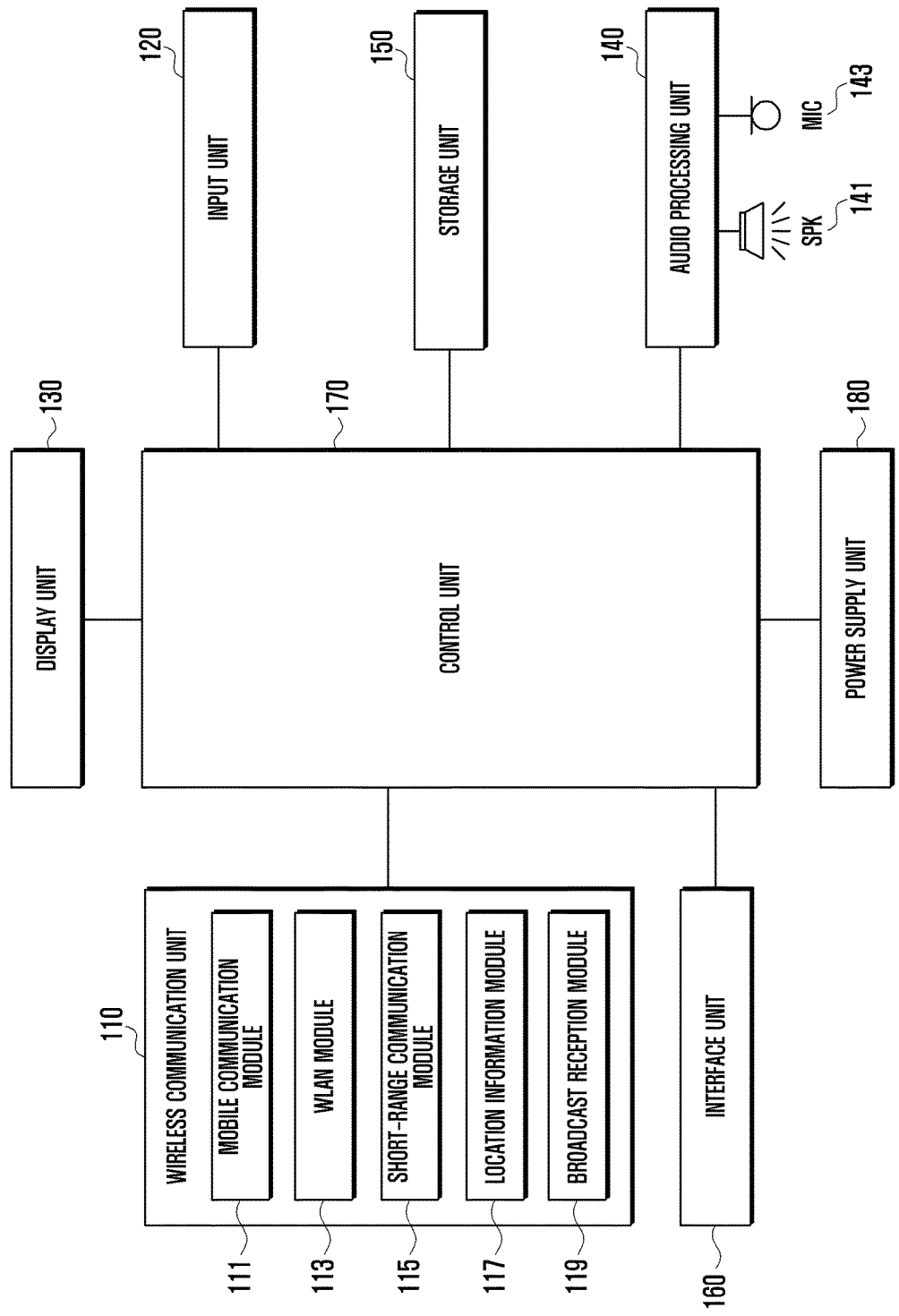
FIG. 1 is a block diagram of a mobile terminal according to an exemplary embodiment.

FIG. 1 is a block diagram of a mobile terminal according to an exemplary embodiment.

Referring to FIG. 1, the mobile terminal includes a wireless communication unit 110, an input unit 120, a display unit 130, an audio processing unit 140, a storage unit 150, an interface unit 160, a control unit 170, and a power supply unit 180. As the components of the mobile terminal shown in FIG. 1 are not indispensable, a new component may be added or an existing component may be omitted or replaced.

The wireless communication unit 110 may include one or more communication modules to wirelessly connect to a mobile communication system or network. For example, the wireless communication unit 110 may include a mobile communication module 111, a WLAN module 113, a short-range communication module 115, a location information module 117, and a broadcast reception module 119.

The mobile communication module 111 sends and receives radio signals to and from at least one of a base station, an external terminal and a server through a mobile communication network. The radio signals may include voice call signals, video call signals, and data signals for text or multimedia messages and feed information. The mobile communication module 111 may send and receive content items provided by communication applications.

The WLAN module 113 is used to wirelessly access the Internet or to form a WLAN link to another mobile terminal, and may be an internal (fixed) or removable module. Wireless Internet access may be achieved through many different types of technologies, such as Wi-Fi, WiBro (Wireless Broadband), WiMAX (Worldwide Interoperability for Microwave Access), or HSDPA (High Speed Downlink Packet Access). The WLAN module 113 may send and receive feed information through a wireless Internet connection.

The short-range communication module 115 may perform short-range communication based on various different types of short-range communication technologies, such as Bluetooth, RFID (Radio Frequency Identification), IrDA (Infrared Data Association), UWB (Ultra Wideband), ZigBee or NFC (Near Field Communication).

The location information module 117 is a module for identifying the current location of the mobile terminal. A GPS (Global Positioning System) receiver is a representative example of the location information module 117. The location information module 117 may obtain 3D location information composed of longitude, latitude and altitude coordinates by applying trigonometry to distance and time data received from three or more base stations. Alternatively, the location information module 117 may obtain current location information using distance and time data received from three or more GPS satellites. Location information may be obtained through various other schemes as well.

The broadcast reception module 119 may receive TV, radio and data broadcast signals and broadcast information regarding channels, programs and providers from an external broadcast management server through broadcast channels including satellite channels and terrestrial channels.

The input unit 120 generates an input signal for manipulating the mobile terminal. The input unit 120 may include a keypad, dome switch, touchpad (e.g., resistive/capacitive), jog wheel and jog switch.

The display unit 130 displays information processed by the mobile terminal and information to be processed by the mobile terminal. For example, during a call, the display unit 130 may display a call handling user interface (UI) or a graphical UI (GUI) screen. During a video call or an image capture mode, the display unit 130 may display a received image, captured image, or UI or GUI screen. In particular, the display unit 130 may display a UI or GUI screen for internally or externally collected feed information. When a communication application is executed, the display unit 130 may display content items exchanged through the communication application on an application handling screen and display a feed list for feed information. Representative screens output by the display unit 130 are described later.

The display unit 130 may be realized using a technology based on at least one of liquid crystal display (LCD), thin film transistor liquid crystal display (TFT LCD), light emitting diodes (LED), organic LEDs (OLED), active matrix OLEDs (AMOLED), flexible display, bendable display, and 3-dimensional display. The display unit 130 may also use a transparent display technology so as to be seen from the outside. It is understood that the display unit 130 may also be realized by using other types of display technologies.

The display unit 130 may be combined with a touch panel which senses touch gestures to form a touchscreen, which acts as an input and output device.

The touch panel may generate an electrical input signal corresponding to a capacitance or pressure change caused by touching a portion of the display unit 130. The touch panel may detect the location, area, and pressure of a touch. A signal corresponding to a touch on the touch panel is sent to a touch controller (not shown). The touch controller processes the touch signal and sends corresponding touch data to the control unit 170. Thereby, the control unit 170 may identify the touched region of the display unit 130.

The audio processing unit 140 sends an audio signal from the control unit 170 to a speaker 141, and sends an audio signal such as a voice signal from a microphone 143 to the control unit 170. Under control of the control unit 170, the audio processing unit 140 may audibly output voice or sound data through the speaker 141, and convert an audio signal, such as a voice signal collected by the microphone 143, into a digital signal, and send the digital signal to the control unit 170.

The speaker 141 is used to output audio data received through the wireless communication unit 110 or audio data stored in the storage unit 150 during a call, recording, speech recognition, or broadcast reception. The speaker 141 is used to output sound related to a function being executed, such as a ringtone indicating reception of a call, or a message or sounds produced by music content playback.

The microphone 143 collects an acoustic signal from the outside during a call, recording, or speech recognition and converts the acoustic signal into sound data. During a call, sound data may be transmitted through the mobile communication module. The microphone 143 may use various noise reduction algorithms to remove or reduce noise from an acoustic signal collected from the outside.

The storage unit 150 may store programs for operation of the control unit 170 and temporarily or permanently store input/output data, such as phonebooks, messages, audio files, still images, electronic books, moving images and feed information. The storage unit 150 may store information regarding usage frequencies and priorities of individual data items such as phone numbers, messages, multimedia files and feed information entries. The storage unit 150 may store vibration data and sound data to be output in various patterns in response to touches on the touchscreen. In particular, the storage unit 150 may store content items sent and received through a communication application, may store feed information created at or received by the mobile terminal, and may store a feed list of feed information.

The storage unit 150 may include one or more of various types of storage media, such as flash memory, a hard disk, multimedia or other memory cards (micro, SD or XD), a random access memory (RAM), a static random access memory (SRAM), a read only memory (ROM), a programmable read-only memory (PROM), an electrically erasable programmable read-only memory (EEPROM), a magnetic RAM (MRAM), a magnetic disk, and an optical disc. The storage unit 150 may function in cooperation with a web storage entity via the Internet.

The interface unit 160 provides data and/or power paths leading to external devices. The interface unit 160 is used to send and receive data to and from external devices, and receives power from an external power source. For example, the interface unit 160 may include a plurality of ports for a wired or wireless headset, battery charger, memory card, device with an identification module, audio input/output, video input/output, and earphone. The interface unit 160 may further include a single port which functions as both a data and a power path.

The control unit 170 controls overall operations of the mobile terminal. For example, the control unit 170 performs control and processing operations for voice, video and data calls. The control unit 170 may include a multimedia module for playback of multimedia data. Such a multimedia module may be realized as an internal component of the control unit 170 or as a separate (external) entity. In particular, the control unit 170 controls operations to collect and share feed information.

The control unit 170 controls execution of a communication application according to user input, and checks for an occurrence of a share event during the execution of the communication application. That is, the control unit 170 checks transmission of content or reception of content through the communication application. When a share event (namely, content transmission or content reception) is detected, the control unit 170 generates feed information for the sent or received content. For example, the control unit 170 may extract content corresponding to the share event and generate feed information using metadata of the extracted content. According to an exemplary embodiment, the control unit 170 may receive a share event with respect to content through a communication application and control an operation to generate feed information using the content.

When feed information is generated, the control unit 170 may control the displaying of the feed information through a feed interface, which supports convenient sharing of feed information. The control unit 170 may control the displaying of a feed list on the display unit 130 according to user input starting from the bezel of the mobile terminal which slides the feed list on the bezel towards an inner portion of the screen.

The control unit 170 controls an operation to utilize stored feed information according to a user request (for example, sharing, profile setting or service recommendation). Control operations of the control unit 170 are described in detail later with reference to the drawings.

The power supply unit 180 supplies power from an internal or external power source to the components of the mobile terminal under control of the control unit 170.

Various exemplary embodiments can be implemented in hardware or as software or computer code that can be stored in a storage medium readable by a computer or a similar device. Hardware implementation may be achieved using at least one of an application specific integrated circuit (ASIC), a digital signal processor (DSP), a digital signal processing device (DSPD), a programmable logic device (PLD), a field programmable gate array (FPGA), a processor, a controller, a micro-controller, a microprocessor, and an electric unit realizing a specific function. Some exemplary embodiments may be directly implemented by the control unit 170. Exemplary embodiments of procedures and functions described herein may be implemented as separate software modules. Each software module may perform one or more functions or operations described herein.

The mobile terminal according to the exemplary embodiment shown in FIG. 1 may be any information and communication appliance or multimedia appliance using an application processor (AP), graphical processing unit (GPU), or central processing unit (CPU). For example, the mobile terminal may be a mobile communication terminal based on communication protocols supporting various communication systems, a tablet computer, a smartphone, a digital camera, a portable multimedia player (PMP), a media player, a portable game console, a laptop computer, or a personal digital assistant (PDA). In addition, methods according to exemplary embodiments may be applied to various display devices such as, for example, a digital TV, digital signage (DS), and a large format display (LFD).

Figure 2:
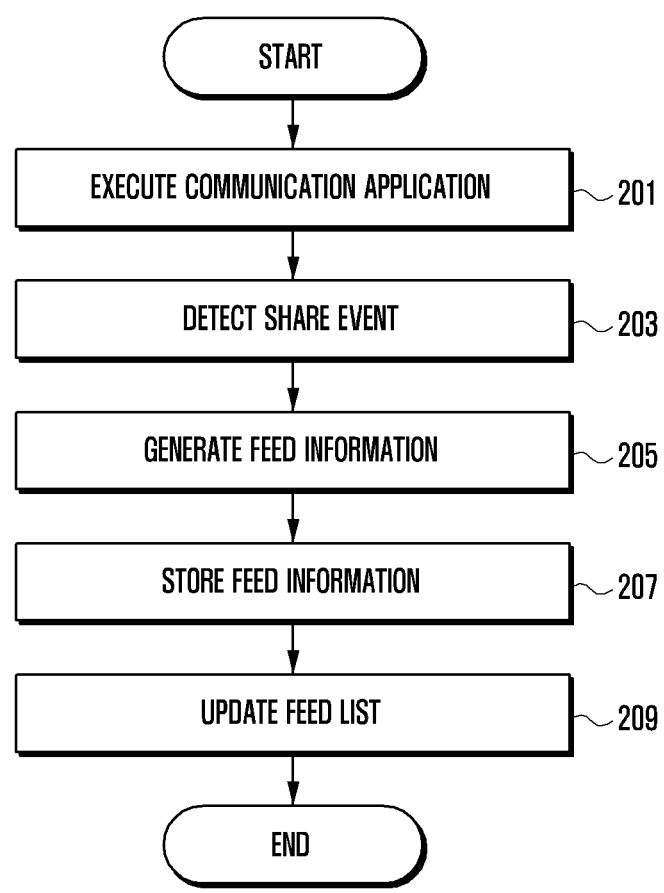
FIG. 2 is a flowchart of a procedure performed by the mobile terminal to generate feed information according to an exemplary embodiment.

FIG. 2 is a flowchart of a procedure performed by the mobile terminal to generate feed information according to an exemplary embodiment Referring to FIG. 2, the control unit 170 of the mobile terminal executes a communication application according to user input at operation 201. In this example, the communication application is an application supporting transmission and reception of content between users, and may be a message application, a messenger (or chat) application, an e-mail application or an SNS application.

The control unit 170 detects user input corresponding to a share event during execution of the communication application at operation 203. In this example, a share event corresponds to transmission of content (such as a document, photograph, music file or moving image) as an attachment through a communication application, or to reception of content through the communication application. That is, a share event may correspond to an exchange of content items between users in the course of using a communication application. For example, when a first mobile terminal communicates with a second mobile terminal through a communication application, a share event may indicate transmission of a content item as an attachment transmitted by the first mobile terminal to the second mobile terminal (transmission event) or reception of a content item received by the first mobile terminal from the second mobile terminal (reception event).

When a share event is detected, the control unit 170 generates feed information on the basis of content associated with the share event at operation 205. For example, a user may send content as an attachment through the communication application or receive content through the communication application from another user. Hereinafter, transmitted content or received content (which may be transmitted or received as an attachment) may be referred to as a share file.

The control unit 170 extracts the share file and generates feed information using metadata for the share file, such as file information, sharer user information, or context information (information related to the context in which the content is shared, for example, the time when the content is shared, the weather near the mobile terminal when the content is shared, the location of the mobile terminal when the content is shared, etc.).

The control unit 170 stores the feed information at operation 207, and updates a feed list using the feed information at operation 209. For example, the control unit 170 may store the feed information together with the existing feed information, which may be stored as an existing feed list, and add the feed information to the existing feed list.

FIGS. 3 to 6 depict screen representations illustrating operations of mobile terminals according to an exemplary embodiment.

Figure 3:
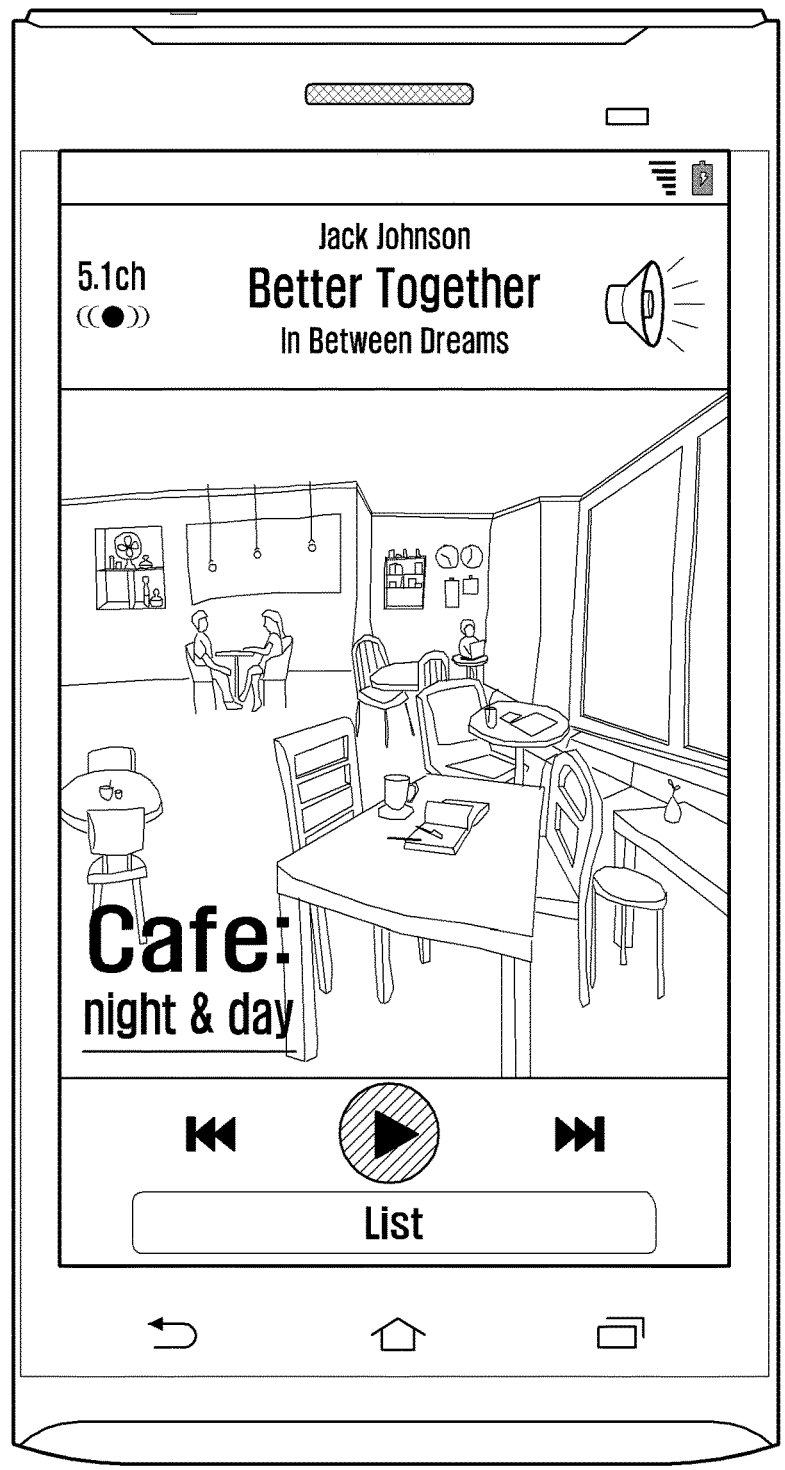
FIGS. 3 to 6 depict screen representations illustrating operations of mobile terminals according to an exemplary embodiment.

In FIG. 3, a first mobile terminal executes a music playback application to play back music content. That is, a first user executes a music playback application on the first mobile terminal and listens to music.

Figure 4:
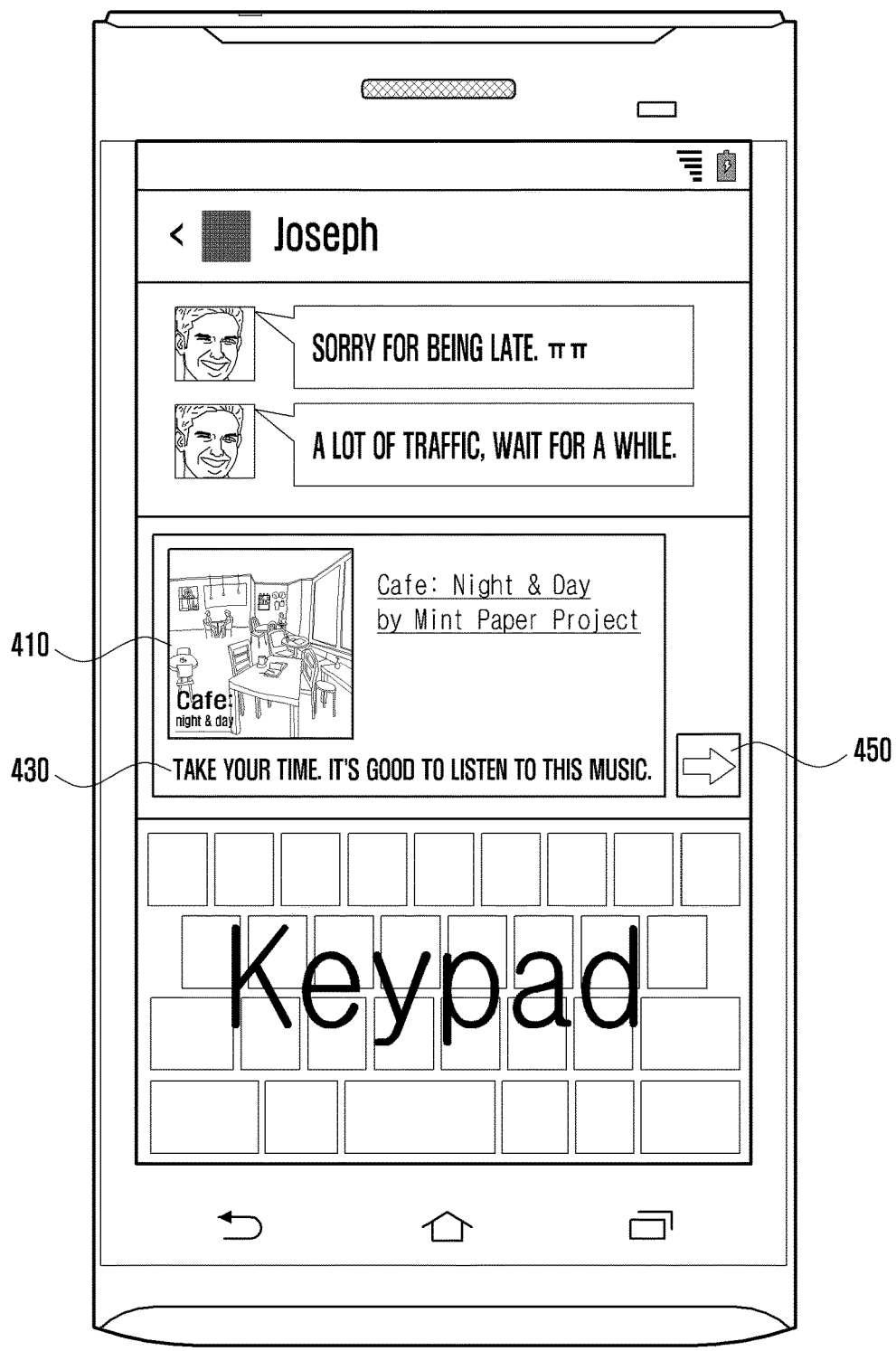

When a share action for the music content being played back is activated according to user input, the first mobile terminal displays a communication application screen as shown in FIG. 4. That is, upon activation of the share action, the first mobile terminal performs a screen transition from the screen shown in FIG. 3 to the screen shown in FIG. 4. According to an exemplary embodiment, a share action may be activated by a user desiring to share content, and a preset communication application may be executed when the share action is activated by the user. A share action may be activated in many different ways, for example, when a user presses a region of the screen for a predetermined time duration to thereby output a function selection menu and selects a share option in the function selection menu. A share action may be activated when a touch event such as a flick or touch gesture is generated in a preset direction on the screen. A share action may be activated when the user changes the posture of the first mobile terminal in a preset way (for example, by shaking the first mobile terminal left and right). A share action may be activated when an item such as icon, button or text is selected at a preset region of the screen. As described above, a share action may be activated in various ways.

FIG. 4 illustrates a screen output when the first user (e.g., Kevin) of the first mobile terminal executes a communication application. In FIG. 4, the communication application is an SNS application. For example, to share the music content 410 with at least one second user (e.g., Joseph), the first user may execute an SNS application and attach music content 410 being played back to the SNS application. After attachment of the music content 410, the first user may input an accompanying message 430 and press a send button 450. Then, the music content 410 may be transmitted from the first mobile terminal to the second mobile terminal.

Figure 5:
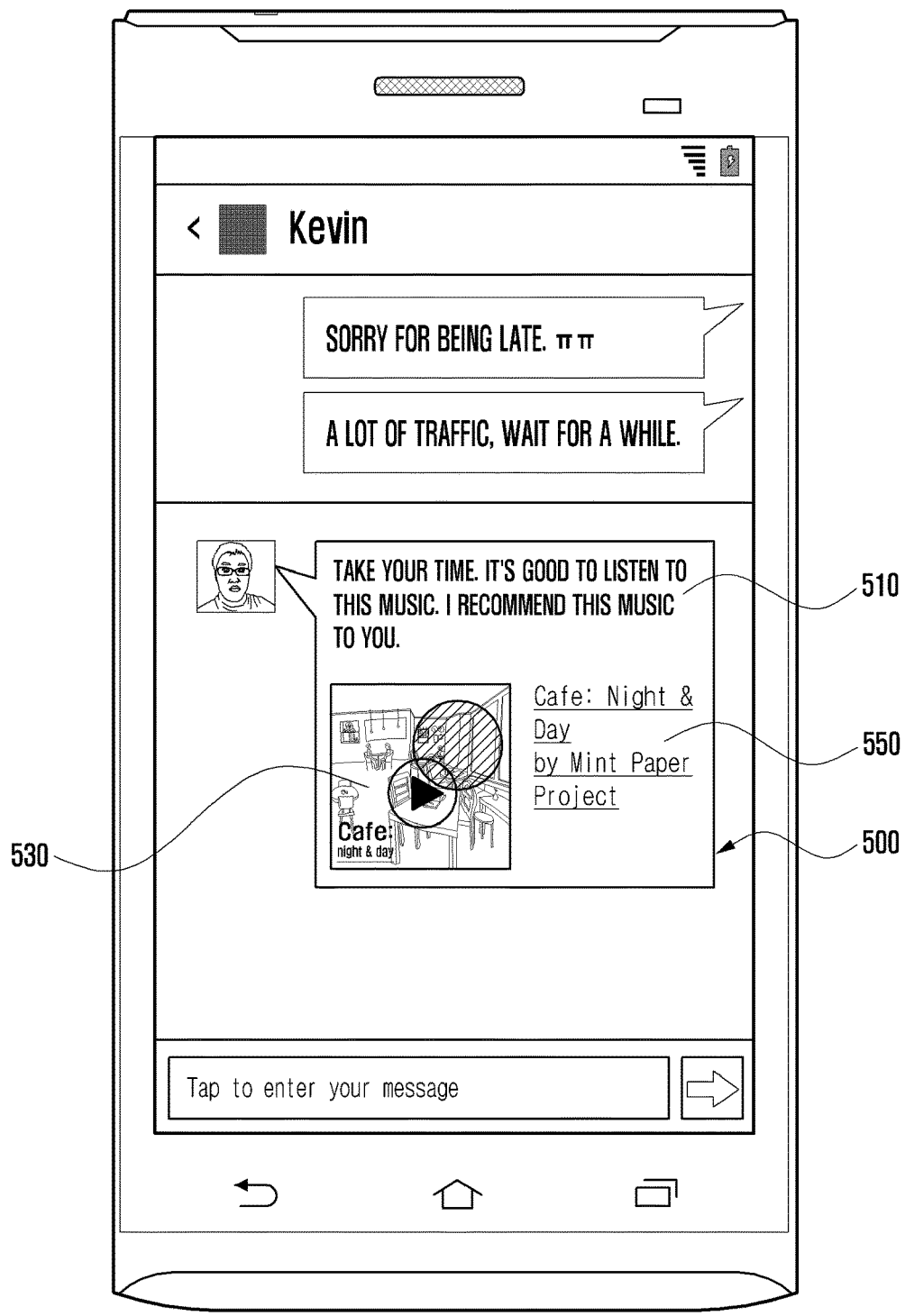

FIG. 5 illustrates a screen output when the second mobile terminal receives the music content 410 and accompanying message 430 from the first mobile terminal through the communication application. That is, FIG. 5 illustrates a screen of the second mobile terminal, which has received music content from the first mobile terminal through a communication application. As shown in FIG. 5, messages exchanged between the first user (e.g., Kevin) and the second user (e.g., Joseph) and a speech bubble 500 displaying the music content and accompanying message sent by the first user are output on the screen.

The speech bubble 500 may contain the music content 530 and accompanying message 510 sent by the first user, and a content description 550 describing the music content 530. The second user may select the music content 530 by tapping the visual representation of the music content 530 to issue a playback request, and the first mobile terminal may play back the music content 530 to output corresponding sound with a playback screen.

Figure 6:
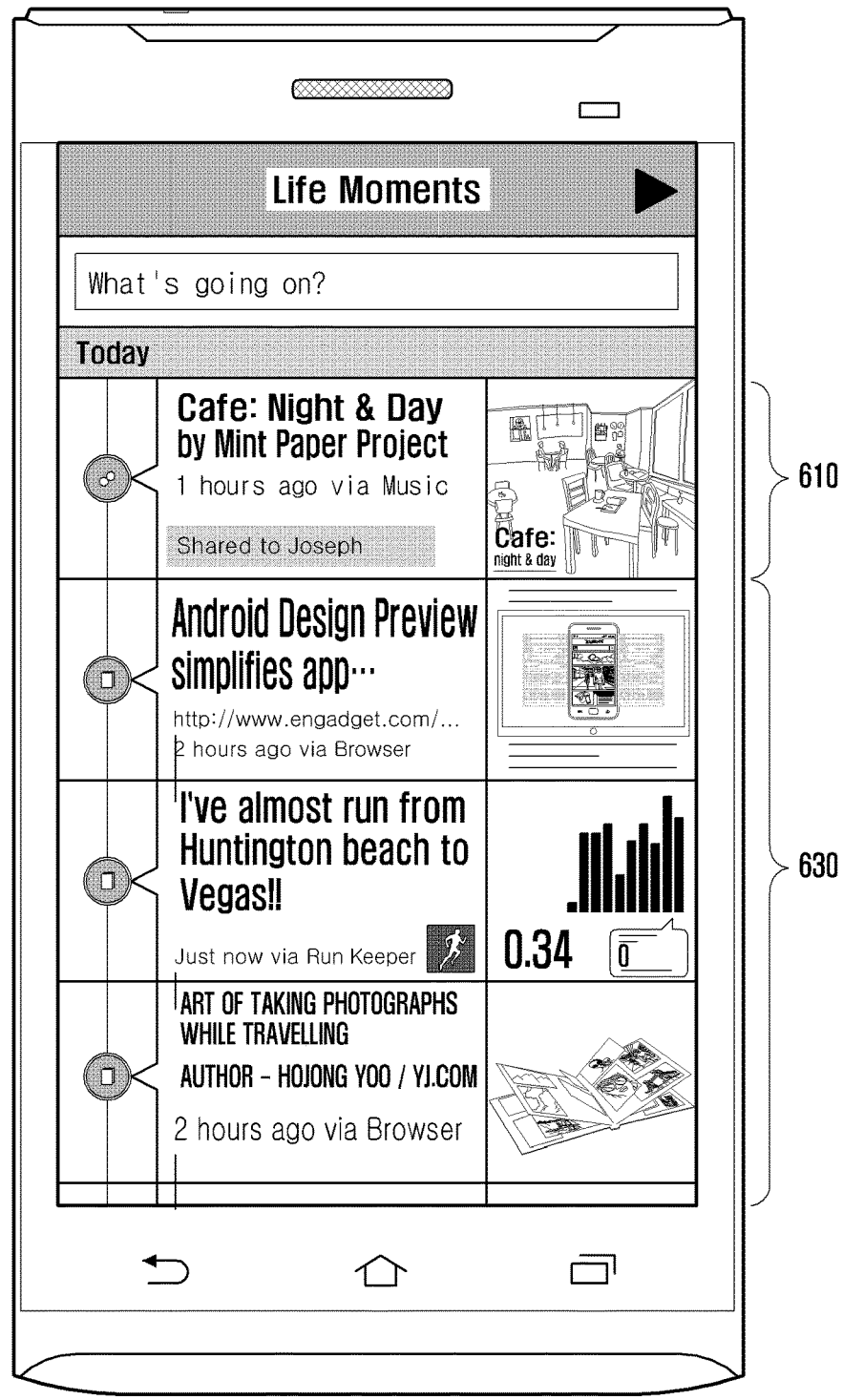

When a share event with respect to music content occurs as shown in FIGS. 3 to 5, each of the first mobile terminal and second mobile terminal may update and manage a feed list by generating feed information based on the music content. That is, the mobile terminal transmitting the music content and the mobile terminal receiving the music content may each generate feed information for the music content and perform feed information management. FIG. 6 illustrates an example of a mobile terminal performing feed information management. FIG. 6 exemplarily illustrates a screen of the first mobile terminal, in which new feed information 610 generated for the share event is added to a feed list of existing feed information 630.

In FIG. 6, for music content sent to the second user for sharing, the new feed information 610, which is generated by combining a description of the content (e.g., content name, content image and the like) for the shared music content, sharer user information (such as "Shared to Joseph") and context information, is added to a feed list of existing feed information 630. A detailed description is given of a process of manipulating a feed list according to a share event with reference to FIG. 7.

Figure 7:
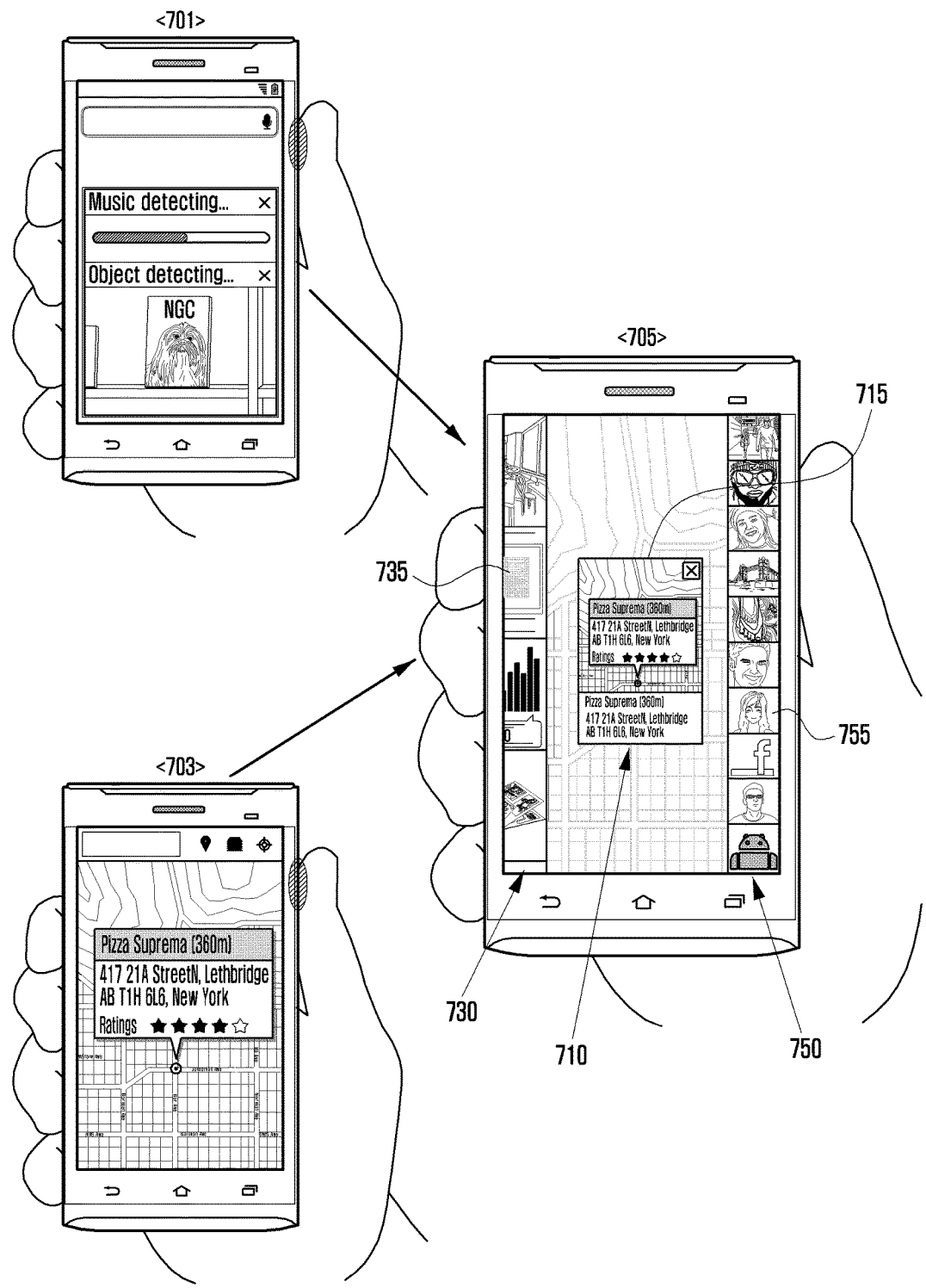
FIG. 7 depicts screen representations for providing a feed list in the mobile terminal according to an exemplary embodiment.

FIG. 7 depicts screen representations for providing a feed list in the mobile terminal according to an exemplary embodiment.

FIG. 7 illustrates the initiation of feed information generation and a UI screen outputting generated feed information.

In the exemplary embodiment, the generation of feed information may be initiated when a user activates a capture action or a share action as described before. As indicated by reference symbol 701, in the course of using a function of the mobile terminal (such as, for example, playback of music content using a player application, displaying of a map using a map application, or displaying of photographs using a gallery application), the user may activate a capture action by entering a preset capture button. Then, the mobile terminal may create capture data by capturing a screen image of the current content (such as music content, a displayed map or a displayed photograph), extract metadata of the current content, and generate feed information by combining the capture data and metadata.

As indicated by reference symbol 703, in the course of using a function of the mobile terminal (such as, for example, playback of music content using a player application, displaying of a map using a map application, or displaying of photographs using a gallery application), the user may activate a share action for sharing. Here, a communication application associated with the share action may be initiated in the background.

In response to user input, the mobile terminal may create capture data by capturing a screen image of the current content (such as music content, a displayed map or displayed photograph), extract metadata of the current content, and generate feed information by combining the capture data and metadata. In particular, a share action may be activated in the course of using a communication application or a non-communication application.

When feed information is generated in response to activation of a capture action or share action, a feed interface may be provided to support convenient sharing of feed information as indicated by reference symbol 705. That is, reference symbol 705 indicates a feed interface displayed on the screen according to execution of a feed information sharing application.

As indicated by reference symbol 705, the feed interface includes a capture view region 710, capture panel region 730, and share panel region 750. Here, the capture view region 710 may be placed at the center, the capture panel region 730 may be placed to the left of the capture view region 710, and the share panel region 750 may be placed to the right of the capture view region 710. It is understood that the configuration of the feed interface is not limited to the configuration shown by reference symbol 705. For example, the capture panel region 730 and share panel region 750 may be arranged vertically instead of horizontally, or may be arranged in many other ways.

Feed information 715 composed of capture data and metadata is displayed in the capture view region 710. In particular, the feed information 715 may be presented as a reduced image in the capture view region 710.

The capture panel region 730 is a region at which the feed list may be invoked. Parts of the feed list may be presented as preview images in the capture panel region 730. The user may select specific feed information 735 in the capture panel region 730 to thereby present the feed information 735 in the capture view region 710. The user may perform up and down interactions (gestures) to scroll up and down the feed list in the capture panel region 730, and may perform left and right interactions to add or remove a piece of feed information into or out of the capture view region 710. For example, the user may touch a portion of the capture panel region 730 and move the touch upward or downward (e.g., drag or flick) to scroll through the feed list in the capture panel region 730.

When the user touches feed information 735 in the capture panel region 730 and moves the touch in a right direction (e.g., drag or flick), the selected feed information 735 may be displayed in the capture view region 710. Here, the feed information 715 previously displayed in the capture view region 710 may be replaced with the feed information 735. This replacement may be represented using fade-in and fade-out effects. When the user touches feed information 715 in the capture view region 710 and moves the touch in a left direction (e.g., drag or flick), the selected feed information 715 may disappear from the capture view region 710.

The user may manipulate the capture panel region 730 in different ways to display the feed list. For example, when the user selects the capture panel region 730 and moves the capture panel region 730 (e.g., drag or flick) in a right direction, the feed list may be displayed on the screen as previously shown in FIG. 6. According to an exemplary embodiment, the feed list may be presented on the screen according to user interaction starting from the bezel without displaying the capture panel region 730. This feature is described later.

The share panel region 750 provides a share panel 755 for selecting a sharer user wishing to share the feed information. The share panel 755 is used to present stored contact information (for example, a facial image) and communication application information (for example, Facebook) with respect to other users. Here, the contact information and communication application information may be represented in many ways, for example, as an image or icon.

According to an exemplary embodiment, when the feed interface is used during execution of a communication application, only contact information of other users connected through the current communication application may be output in the share panel 755. Hence, the user may select feed information 715 in the capture view region 710 and move the selected feed information 715 to specific contact information 755 (or communication application information) in the share panel region 750 (e.g., drag and drop) to share the selected feed information 715 with another user. The share panel region 750 may support a scroll function in a similar way to the capture panel region 730.

Figure 8:
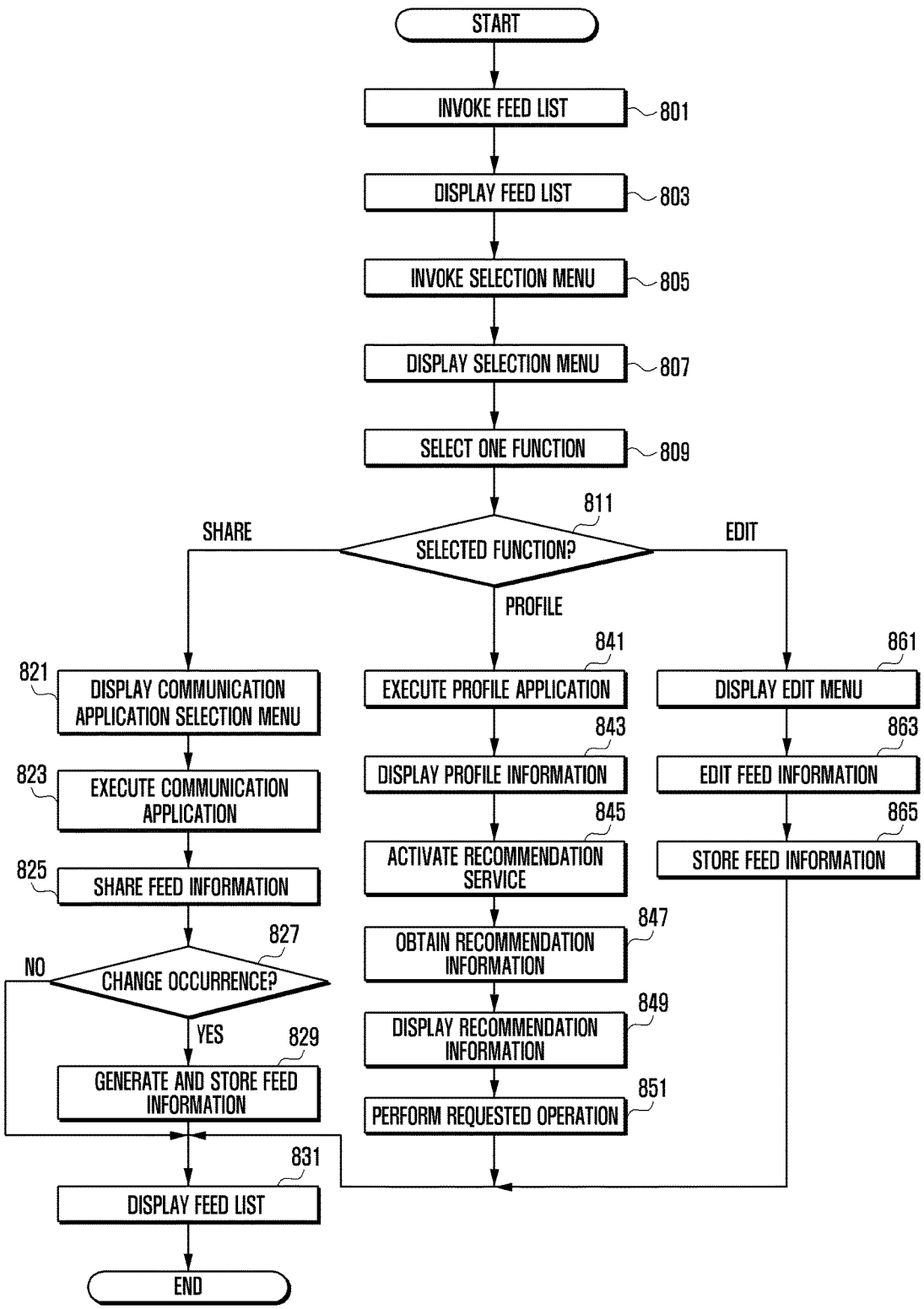
FIG. 8 is a flowchart of a procedure performed by the mobile terminal to utilize feed information according to an exemplary embodiment.

FIG. 8 is a flowchart of a procedure performed by the mobile terminal to utilize feed information according to an exemplary embodiment.

Referring to FIG. 8, the control unit 170 of the mobile terminal detects user input for the feed list and thereby invokes the feed list at operation 801. In response to the feed list invocation, the control unit 170 displays the feed list on the screen at operation 803. The user may, for example, interact by moving the user's touch from the left bezel toward the inside of the screen (e.g., flick or drag). Then, the control unit 170 may display the feed list on the screen by sliding the feed list from the boundary between the left bezel and the screen of the display unit 130. Operations of the mobile terminal are further illustrated with reference to screen representations depicted in FIGS. 9 to 11.

The control unit 170 receives user input for invoking a selection menu while the feed list is displayed at operation 805. For example, the user may select at least one piece of feed information of the feed list and invoke a selection menu for the selected feed information. The user may, for example, press a piece of feed information of the feed list for a predetermined time duration, or may press a menu button (not shown) after selecting a piece of feed information of the feed list to invoke an option menu and select a selection menu from the option menu.

The control unit 170 displays a selection menu on the screen according to user input on the feed list at operation 807. The displaying of the selection menu is described later in connection with FIG. 12.

The control unit 170 receives user input for function selection from the selection menu at operation 809.

Upon reception of user input for function selection, the control unit 170 determines the selected function at operation 811. For example, the control unit 170 may determine whether the selected function is a share function, a profile function, or an edit function. When the selected function is a share function, the control unit 170 proceeds to operation 821; when the selected function is a profile function, the control unit 170 proceeds to operation 841; and when the selected function is an edit function, the control unit 170 proceeds to operation 861.

When the selected function is a share function, the control unit 170 displays a communication application selection menu on the screen at operation 821. For example, the control unit 170 may display a list of communication applications and receive user input for selecting a communication application for feed information sharing. Here, the list may be composed of communication applications based on cloud, messaging, messenger or SNS. Display of a communication application list is illustrated later in connection with FIG. 13.

The control unit 170 executes a communication application selected through the corresponding selection menu at operation 823, and performs an operation to share feed information at operation 825. That is, the control unit 170 may execute a communication application selected by the user, attach feed information selected by the user to the communication application, and send the feed information using a transmission scheme corresponding to the communication application. For example, the control unit 170 may execute an e-mail application, attach feed information to the e-mail application, and send content together with the attached feed information using recipient information entered by the user.

After sharing the feed information, the control unit 170 checks whether a change has occurred in the feed information at operation 827. For example, the control unit 170 may check metadata of the feed information to determine whether sharer information or context information is changed. Items to be checked for a change in the feed information may be specified in user settings.

When a change has occurred in the feed information, the control unit 170 generates new feed information on the basis of the change and stores the feed information at operation 829.

The control unit 170 displays a feed list at operation 831. Here, the feed list may be the same as in operation 803 when there is no change in the feed information, or a feed list containing new feed information generated at operation 829.

When the selected function is a profile function, the control unit 170 executes a profile application at operation 841 and displays user profile information based on feed information at operation 843. For example, the control unit 170 may present user profile information through a profile interface having classified items for basic information, favorite content, a connected device, a behavior pattern and the like. Display of a profile interface is described later with reference to FIG. 14.

The control unit 170 receives user input for a recommendation service through the profile interface at operation 845, and obtains recommendation information from an external server at operation 847. For example, in response to user input for a recommendation service through the profile interface, the control unit 170 may send feed information to a feed server and receive recommendation information corresponding to the feed information from the feed server. Here, the recommendation information may be friend information or content information for personalization according to the requested recommendation service.

The control unit 170 displays the obtained recommendation information on the screen at operation 849. For example, the control unit 170 may display a list of recommended friends or a list of recommended content.

The control unit 170 performs a requested operation based on the recommendation information at operation 851), and displays the feed list at operation 831. For example, in response to a user request, the control unit 170 may add the recommended friend information to a contact list or add the recommended content information to a content list. Thereafter, the control unit 170 may replace the profile interface with the feed list on the screen.

When the selected function is an edit function, the control unit 170 displays an edit menu for editing the feed information on the screen at operation 861. For example, the control unit 170 may present a menu interface for modifying, deleting or adding entries of feed information including content information, sharer information and context information.

The control unit 170 edits the feed information according to user input through the edit menu at operation 863, and stores the edited feed information at operation 865. Here, the edited feed information may replace the existing feed information or be stored separately from the existing feed information.

The control unit 170 displays the feed list on the screen at operation 831. Here, in the feed list, an entry of feed information may include updated information or newly added information according to the previous editing operation.

FIGS. 9 to 14 depict screen representations illustrating operations of the mobile terminal.

Figure 9:
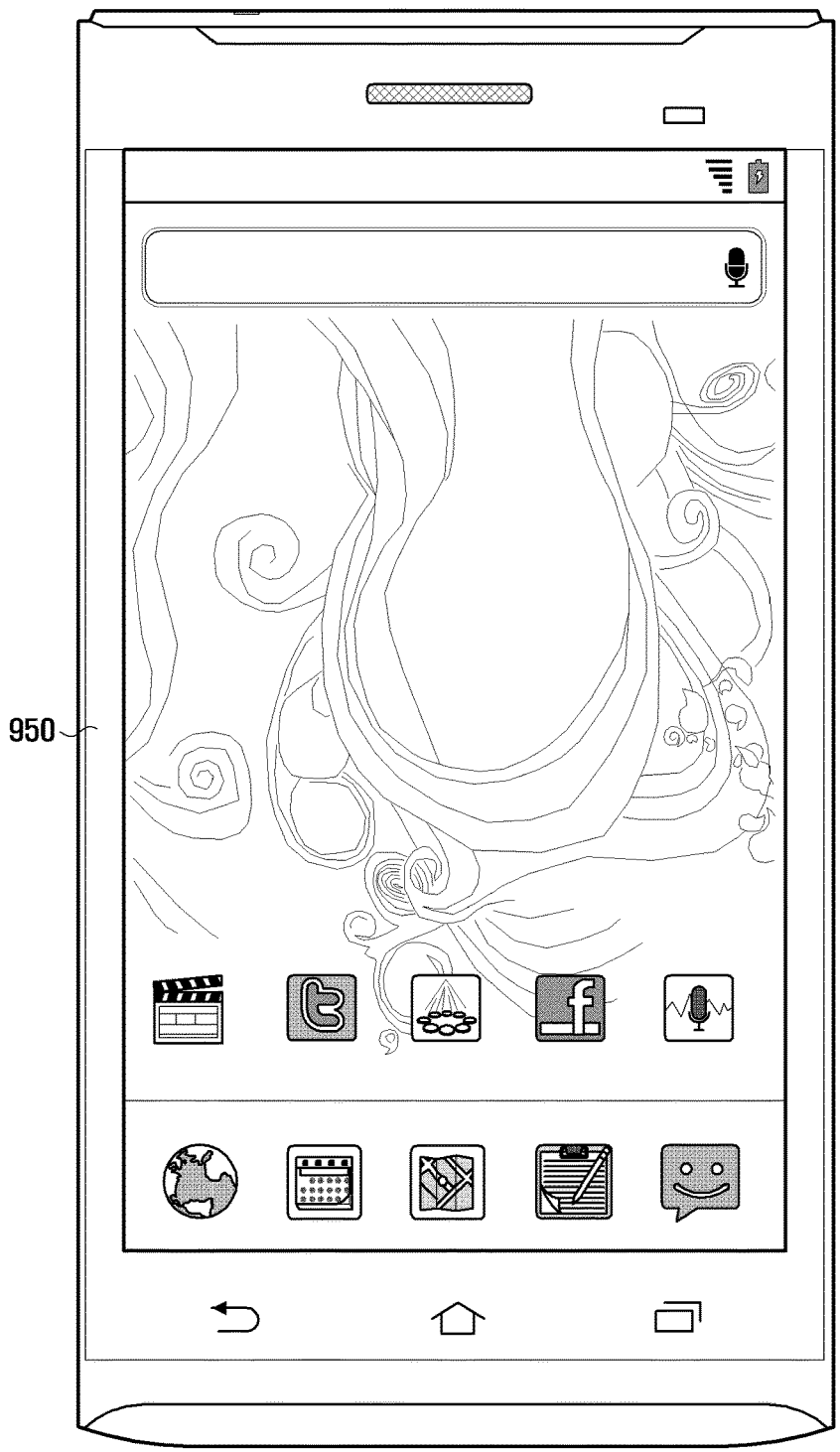
FIGS. 9 to 14 depict screen representations illustrating operations of the mobile terminal according to an exemplary embodiment.

FIG. 9 illustrates a home screen of the mobile terminal. The user may perform a preset interaction for feed list invocation while a screen such as a home screen or application screen is displayed. For example, the user may perform a flick gesture (or drag gesture) starting from the bezel 950 of the mobile terminal (left side in FIG. 9) and moving toward the center of the screen as shown in FIG. 10.

Figure 10:
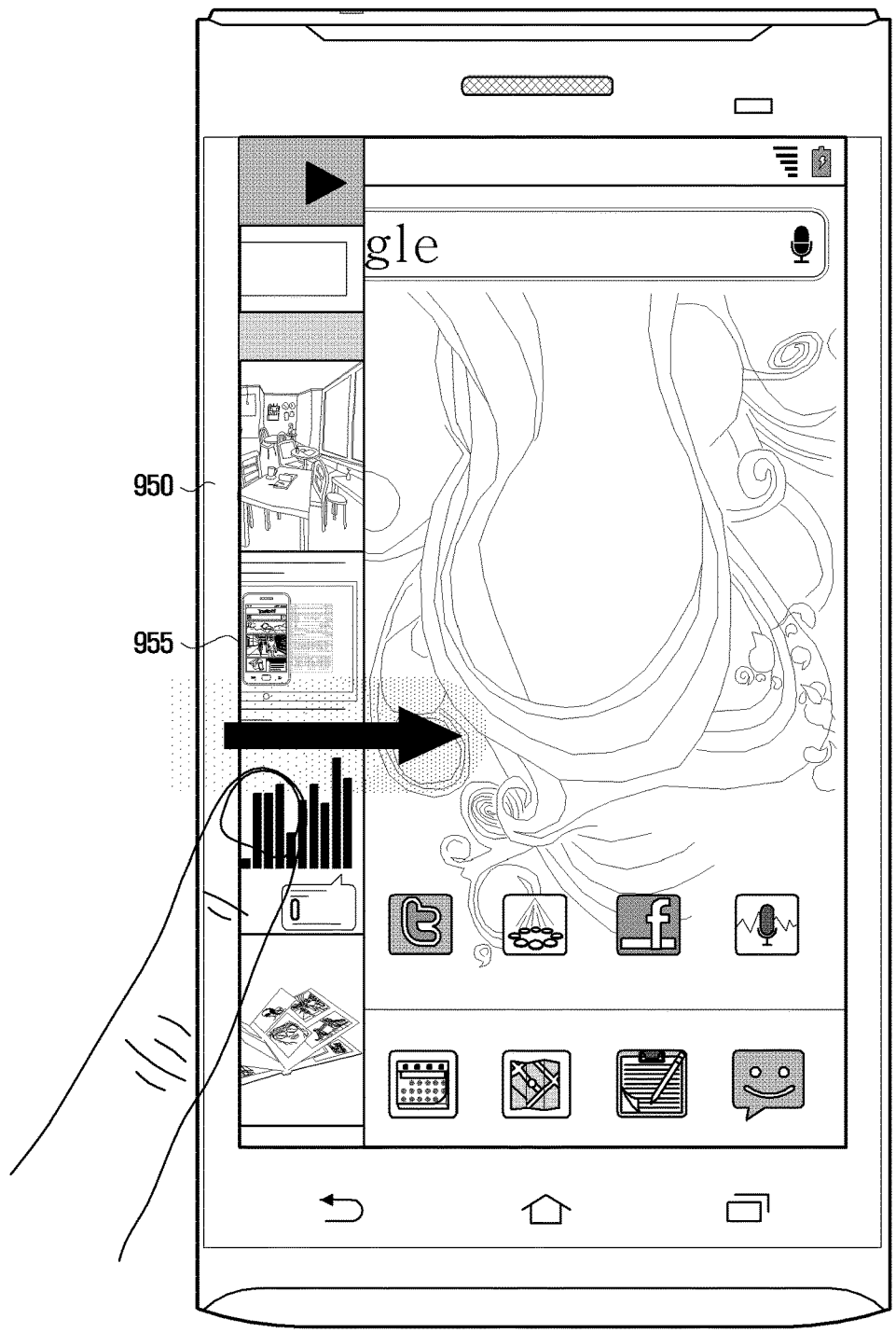
Figure 11:
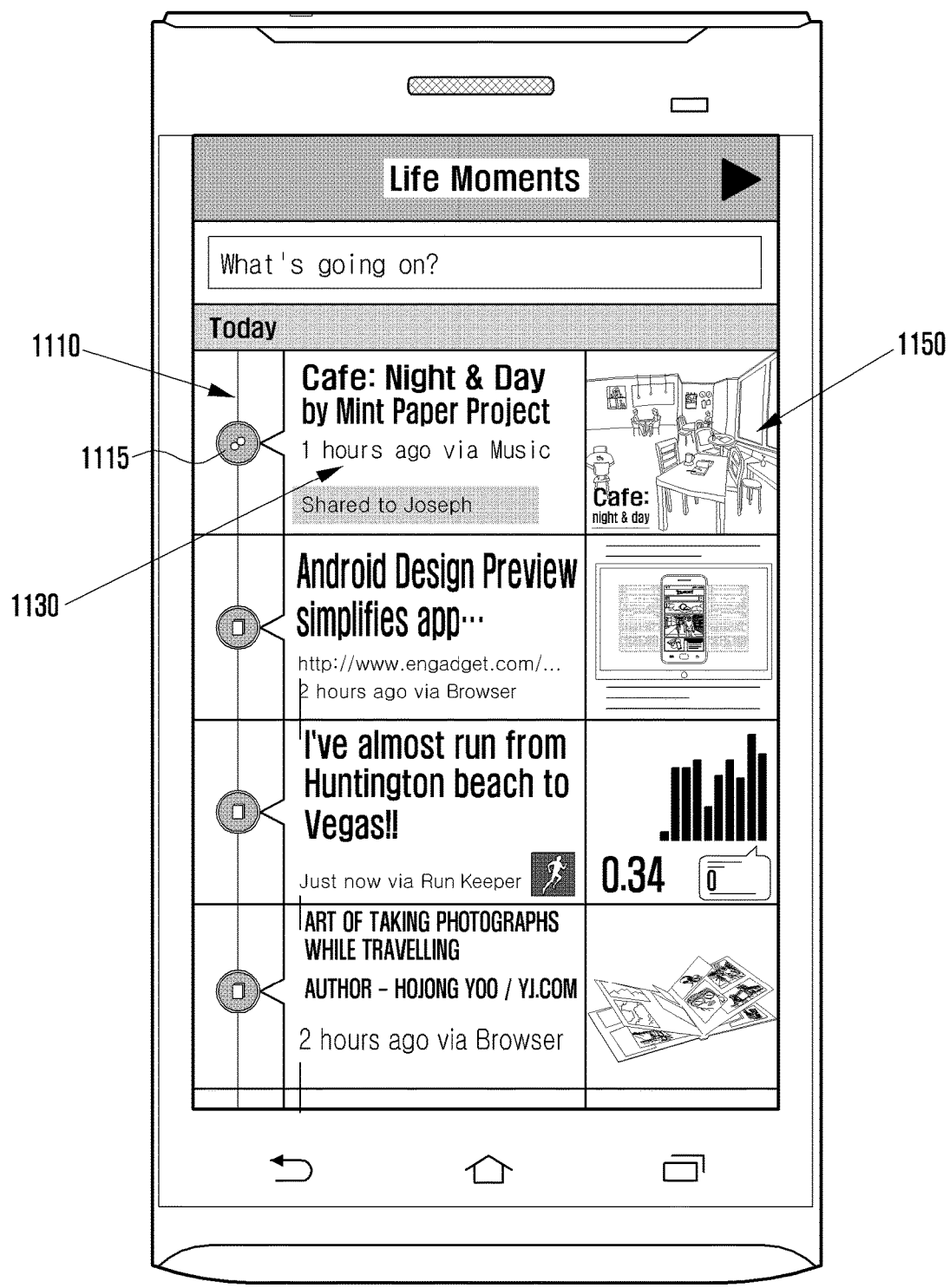

In response to an interaction for feed list invocation (e.g., performing a touch operation starting from the bezel 950 and moving toward the center of the screen as shown in FIG. 10), the mobile terminal displays a feed list on the screen by sliding the feed list from the boundary 955 between the bezel 950 and the display unit 130 as shown in FIG. 11. That is, the mobile terminal performs a screen transition according to user input as shown in FIGS. 9 to 11.

As illustrated in FIG. 11, the mobile terminal may display a feed list composed of feed information generated and stored according to a share action or a capture action. Entries of the feed list may be arranged according to many different criteria, including, for example, creation time, name, place, content type (such as whether the content is a document, photograph, moving image, still image, map, etc.), and the like. Feed list entries may be arranged according to user settings. For example, in FIG. 11, a feed list entry for particular content may be composed of a type region 1110 in which a type icon 1115 indicating content type is presented, a metadata region 1130 for presenting metadata, and an image region 1150 for presenting capture data. Here, the metadata region 1130 may be used to present information regarding many different characteristics, such as, for example, creation time, place, current weather and sharer users for feed information content. The type icon 1115 may be displayed as an image intuitively representing a document, photograph, moving image, still image, map, etc.

The user may perform an interaction to select at least one entry of the feed list and to display a function selection menu. For example, the user may press a particular entry of the feed list for a predetermined time duration, or may select a particular entry of the feed list and perform a preset interaction for option menu invocation. Then, the mobile terminal may perform a screen transition operation which changes the screen from the screen as shown in FIG. 11 to the screen as shown in FIG. 12.

Figure 12:
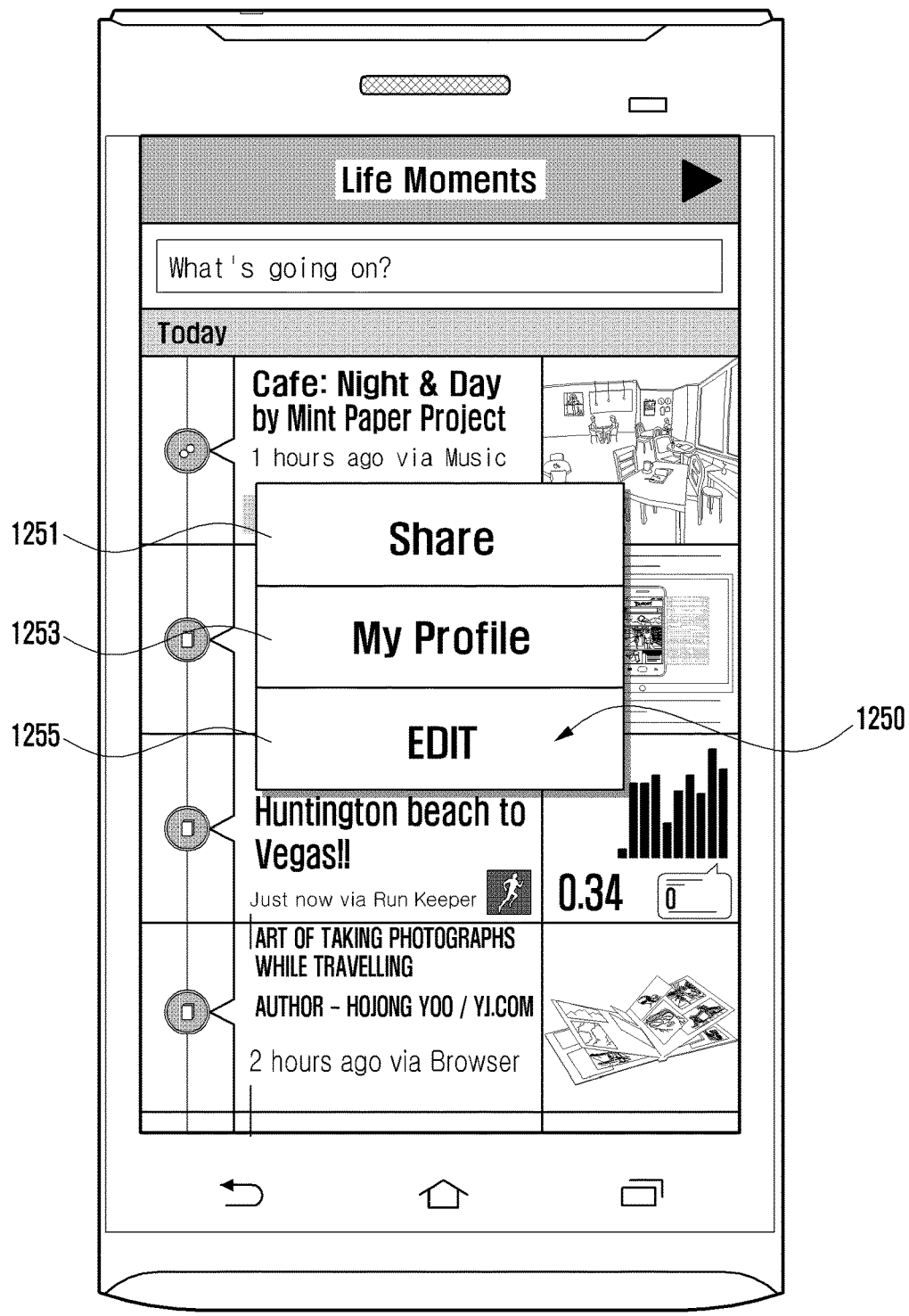

FIG. 12 illustrates the displaying of a function selection menu 1250 on the feed list screen. The function selection menu 1250 may be presented as a pop-up on a feed list screen as shown in FIG. 7.

Figure 13:
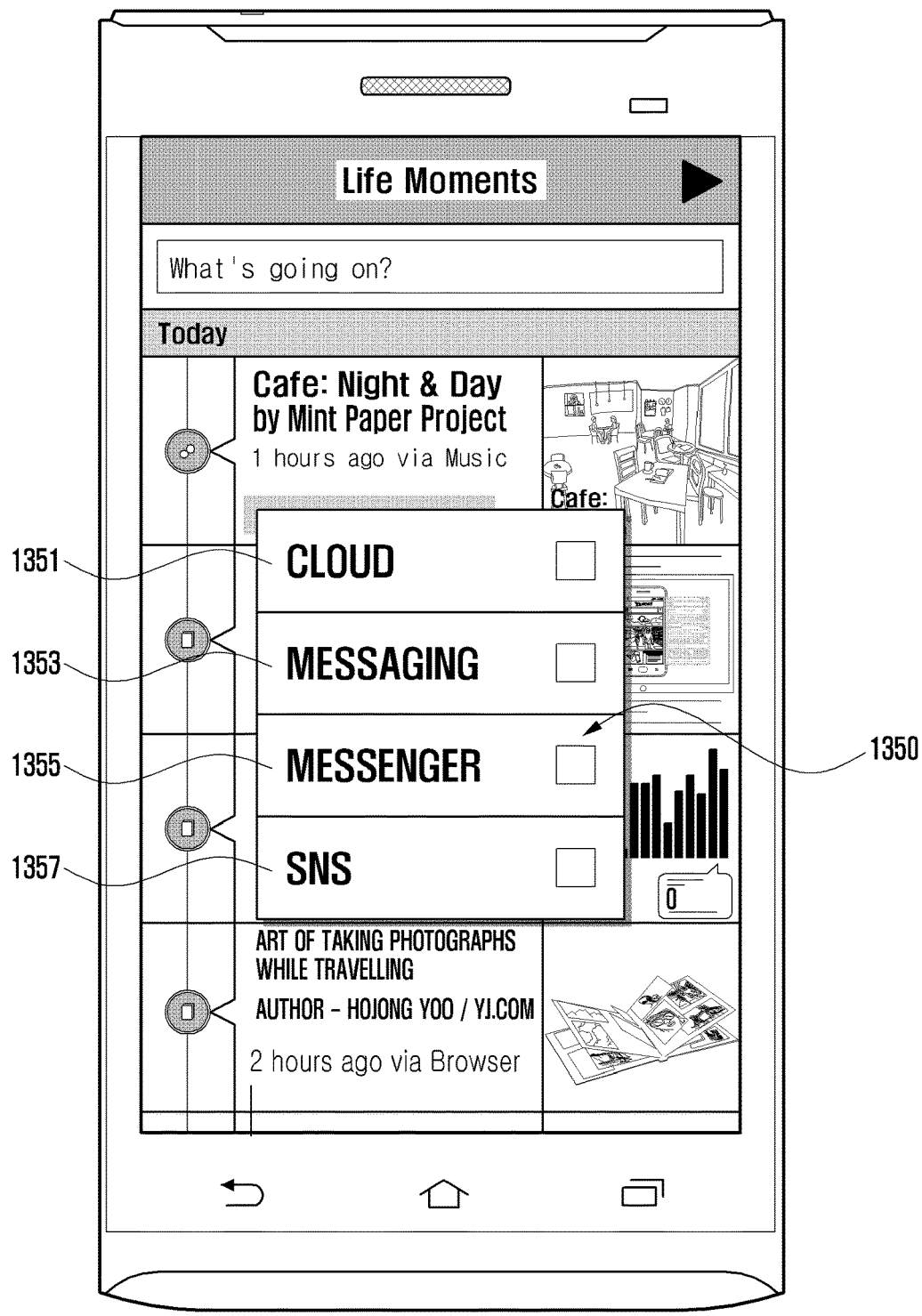
Figure 14:
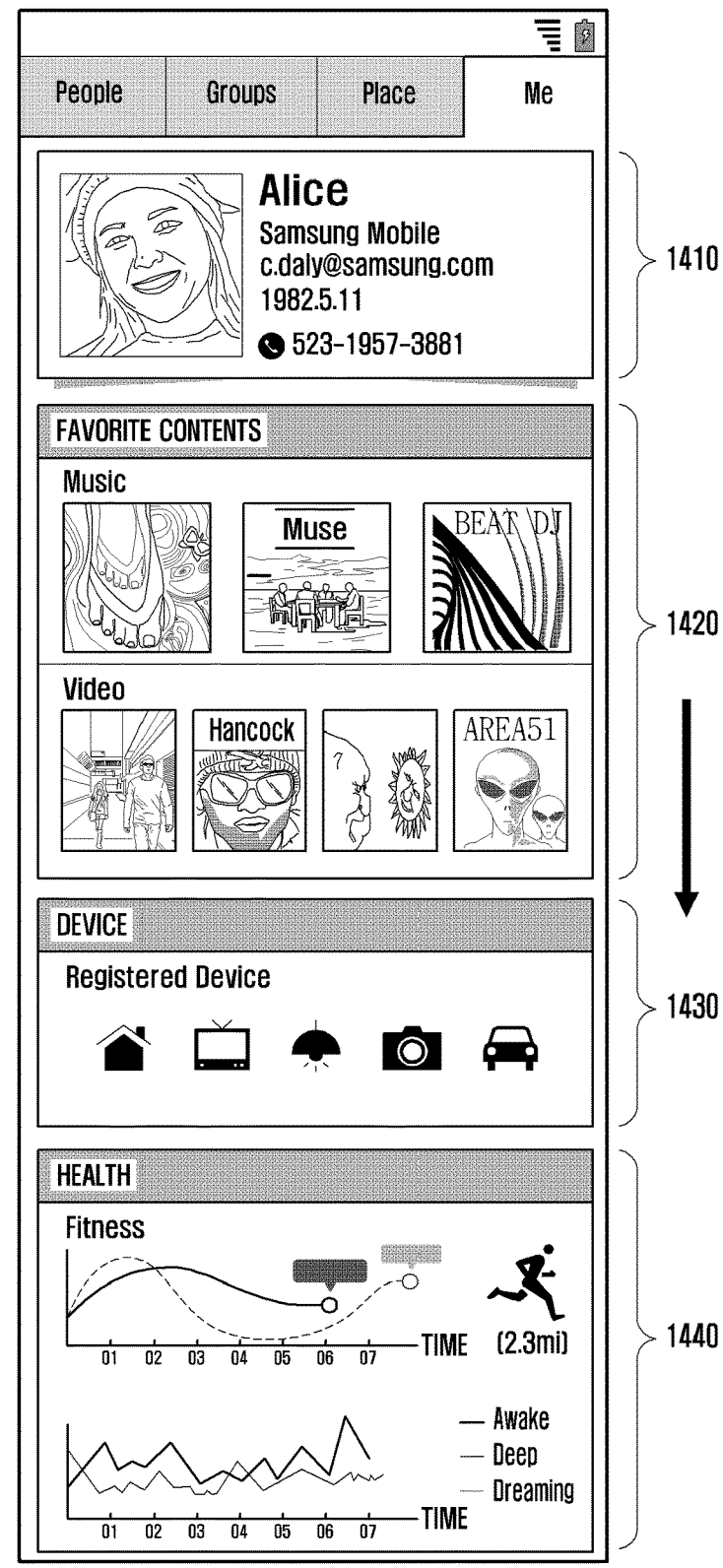

The user may select a function item of the function selection menu 1250. For example, the user may select one of "Share" 1251, "My Profile" 1253 and "Edit" 1255 from the function selection menu 1250. When the user selects "Share" 1251, the mobile terminal may perform a screen transition operation to change the screen to the screen as shown in FIG. 13. When the user selects "My Profile" 1253, the mobile terminal may perform a screen transition operation to change the screen to the screen as shown in FIG. 14. When the user selects "Edit" 1255, the mobile terminal may display an edit interface screen (not shown).

FIG. 13 illustrates a screen output when "Share" 1251 for feed information sharing is selected from the function selection menu 1250. Here, the function selection menu 1250 is replaced with a communication application selection menu 1350. The communication application selection menu 1350 may be presented as a pop-up on a feed list screen as shown in FIG. 7.

The user may select a communication application for feed information sharing from the communication application selection menu 1350. For example, the user may select at least one of "Cloud" 1351, "Messaging" 1353, "Messenger" 1355 and "SNS" 1357. Thereafter, the user may share feed information through the selected communication application. That is, the mobile terminal may execute the selected communication application and share at least one entry (feed information) of the feed list with another mobile terminal through the communication application in execution.

FIG. 14 illustrates a screen output when "My Profile" 1253 for displaying user profile information reflecting feed information is selected from the function selection menu 1250. Selection of "My Profile" 1253 from the function selection menu 1250 may cause the displaying of user profile information through a profile interface.

In FIG. 14, the profile interface is composed of a basic information region 1410 used to present basic user information such as a user image, name, contact number, e-mail address and birthday, a favorite content region 1420 used to present content items such as music, videos, books and games collected using social plug-ins of a communication application or webpage (or preferred or frequently played content items), a device region 1430 used to present information on devices connected to the mobile terminal (for example, a PC, a TV, a camera, a car, a house, a lamp or other appliance, etc.), and a behavior pattern region 1440 used to present sensed information on user activities such as fitness or a sleep cycle.

Social plug-ins named "Like", "Share" or "Bookmark" may be used for content capture in the course of using an SNS or browsing a webpage. That is, social plug-ins may indicate plug-ins providing a capture function in SNS applications and webpages. In the profile interface of FIG. 14, all information of the basic information region 1410, favorite content region 1420, device region 1430, and behavior pattern region 1440 is presented. However, the profile interface may be partially presented owing to screen size limitations, and a scroll operation or other operation may be performed to view a hidden part of the profile interface.

While the profile interface is displayed as in FIG. 14, the user may activate a friend recommendation service to receive recommendations for friends having preferences similar to those of the user (according to user profile information) or activate a content recommendation service to receive recommendations for personalized content items (according thereto). Then, the mobile terminal may send a request for recommendation information (conforming to the user profile information) to a recommendation server (not shown), receive recommendation information from the recommendation server, and present the received recommendation information to the user.

According to features of the exemplary embodiments disclosed herein, a method and apparatus for a mobile terminal may collect not only information explicitly clipped by a user but also content items exchanged between users (e.g. music files, documents, photographs, moving or still images, maps, etc.) as feed information. Hence, types of feed information usable for a recommendation service may be increased.

The method and apparatus may automatically generate feed information regarding content items exchanged during communication with other users (for example, during a conversation, messaging or mailing with other users) using communication applications without requiring explicit manipulation on the content items, and support an intuitive and convenient interface for utilizing the feed information (for example, sharing, profile setting, service recommendation or the like).

As content items provided by a user or other users related to the user are utilized as feed information, credibility of the feed information may be increased. Sharing of reliable feed information may contribute to vitalization of recommendation services in user communities.

The method and apparatus according to exemplary embodiments may be applied to various mobile terminals or devices comparable thereto. The methods and apparatuses according to exemplary embodiments may be used to realize an excellent environment for collecting and sharing feed information. Hence, the exemplary embodiments may enhance user convenience, usability and competitiveness of the mobile terminal.

Exemplary embodiments may be implemented as computer programs and may be stored in various computer readable storage media. The computer readable storage media may store program instructions, data files, data structures and combinations thereof. The program instructions may include instructions developed specifically for the exemplary embodiments and existing general-purpose instructions.

The computer readable storage media may include magnetic media such as a hard disk and floppy disk, optical media such as a CD-ROM and DVD, magneto-optical media such as a floptical disk, and memory devices such as a ROM and RAM. The program instructions may include machine codes produced by compilers and high-level language codes executable through interpreters. Each hardware device may be replaced with one or more software modules to perform operations according to the exemplary embodiments, and vice versa.

Although exemplary embodiments have been described in detail hereinabove, it should be understood that many variations and modifications of the exemplary embodiments described herein will still fall within the spirit and scope of the present disclosure as defined in the appended claims.

What is claimed is:

1. A method for generating feed information in an electronic device, comprising:
   executing an application to reproduce content;
   displaying an image representing the reproduced content on a display;
   detecting a capturing event corresponding to the image representing the reproduced content;
   capturing, in response to the detecting the capturing event, a screen image of the image representing the reproduced content;
   extracting metadata from the content;
   generating feed information based on the extracted metadata and the captured screen image;
   sending the generated feed information to a server; and
   displaying a feed list comprising the generated feed information on the display.

2. The method of claim 1, wherein the metadata includes information describing the content and context information describing a context in which the content is shared.

3. The method of claim 2, wherein the information describing the content comprises title information of the content.

4. The method of claim 1, further comprising:
   displaying a function selection menu according to user input on the feed list, the function selection menu comprising entries enabling a user to select one of a sharing function, a profile function, and an edit function; and
   executing one of the sharing function, the profile function, and the edit function according to user input on the function selection menu.

5. The method of claim 4, further comprising:
   displaying, when the sharing function is selected from the function selection menu, an application selection menu providing selectable communication applications;
   executing one of the communication applications selected from the application selection menu; and
   transmitting feed information selected from the feed list through the executed communication application.

6. The method of claim 5, further comprising:
   generating, when a change has occurred in the feed information, new feed information reflecting the change;
   updating the feed list based on the generated new feed information; and
   displaying the updated feed list.

7. The method of claim 1, further comprising:
   displaying the generated feed information through a feed interface.

8. An electronic device comprising:
   a memory storing instructions;
   a display; and
   a processor configured to execute the instructions to:
      execute an application to reproduce content;
      control the display to display an image representing the reproduced content;
      control to detect a capturing event corresponding to the image representing the reproduced content;
      control to capture, in response to the detecting the capturing event, a screen image of the image representing the reproduced content;
      control to extract metadata from the content;
      control to generate feed information based on the extracted metadata and the captured screen image;
      control to send the generated feed information to a server; and
      control the display to display a feed list comprising the generated feed information.

9. The electronic device of claim 8, wherein the metadata includes information describing the content, and context information describing a context in which the content is shared.

10. The electronic device of claim 9, wherein the information describing the content comprises title information of the content.

11. The electronic device of claim 8, wherein the feed list is composed of entries, each of which includes a type region, a metadata region and an image region displaying the captured screen image.

12. The electronic device of claim 8, wherein the processor is configured to execute the instructions to:
   control the display to display a function selection menu according to user input on the feed list, the function selection menu comprising entries enabling a user to select one of a sharing function, a profile function, and an edit function; and
   control to execute one of the sharing function, the profile function, and the edit function according to user input on the function selection menu.

13. The electronic device of claim 12, wherein the processor is configured to execute the instructions to:
- control the display to display, when the sharing function is selected from the function selection menu, an application selection menu providing selectable communication applications;
- control to execute one of the communication applications selected from the application selection menu; and
- control to transmit feed information selected from the feed list through the executed communication application.

14. The electronic device of claim 13, wherein the processor is configured to execute the instructions to:
- control to generate, when a change has occurred in the feed information, new feed information reflecting the change;
- control to update the feed list based on the generated new feed information; and
- control the display to display the updated feed list.

15. The electronic device of claim 8, wherein the processor is configured to execute the instructions to:
- control an operation of displaying the generated feed information through a feed interface, and
- wherein the feed interface includes a capture view region, a capture panel region and a share panel region.

16. A non-transitory computer readable storage medium storing instructions executable by an electronic device to cause the electronic device to:
- execute an application to reproduce content;
- control to display an image representing the reproduced content on a display coupled to the electronic device;
- control to detect a capturing event corresponding to the image representing the reproduced content;
- control to capture, in response to the detecting the capturing event, a screen image of the image representing the reproduced content;
- control to extract metadata from the content;
- control to generate feed information based on the extracted metadata and the captured screen image;
- control to send the generated feed information to a server; and
- control to display a feed list comprising the generated feed information on the display.

17. The non-transitory computer readable storage medium of claim 16, wherein the metadata includes information describing the content and context information describing a context in which the content is shared.

18. The non-transitory computer readable storage medium of claim 17, wherein the information describing the content comprises title information of the content.

* * * * *